US012774646B2

(12) United States Patent
Al Jaberi et al.

(10) Patent No.: US 12,774,646 B2
(45) Date of Patent: Oct. 27, 2026

(54) METHOD OF BARITE SCALE REMOVAL

(71) Applicant: King Fahd University of Petroleum and Minerals, Dhahran (SA)

(72) Inventors: Jaber Al Jaberi, Al Khober (SA); Badr Bageri, Dhahran (SA); Tinku Saikia, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/458,231

(22) Filed: Jan. 23, 2026

(65) Prior Publication Data

US 2026/0210210 A1 Jul. 23, 2026

Related U.S. Application Data

(60) Provisional application No. 63/748,812, filed on Jan. 23, 2025.

(51) Int. Cl.
*C09K 8/532* (2006.01)
*E21B 37/06* (2006.01)

(52) U.S. Cl.
CPC .............. *E21B 37/06* (2013.01); *C09K 8/532* (2013.01); *C09K 2208/10* (2013.01)

(58) Field of Classification Search
CPC ....................................................... C09K 8/528
See application file for complete search history.

(56) References Cited

U.S. PATENT DOCUMENTS

2002/0117457 A1* 8/2002 Benton .................. C09K 8/528 210/749
2007/0221246 A1* 9/2007 Keatch ................... C09K 8/528 134/41
2008/0035339 A1 2/2008 Welton et al.
2017/0350225 A1* 12/2017 Benoit .................... E21B 43/26
2020/0131432 A1 4/2020 Mahmoud et al.

FOREIGN PATENT DOCUMENTS

CN 118620589 A 9/2024

OTHER PUBLICATIONS

Dunn et al. Dissolution of Barium Sulfate Scale Deposits by Chelating Agents (Year: 1999).*
Hany Gamal, et al., "Barium Sulfate Scale Removal at Low-Temperature", Hindawi Geofluids, vol. 2021, Article 5527818, Mar. 23, 2021, 12 pages.

(Continued)

*Primary Examiner* — William D Hutton, Jr.
*Assistant Examiner* — Avi T Skaist
(74) *Attorney, Agent, or Firm* — Oblon, McClelland, Maier & Neustadt, L.L.P.

(57) ABSTRACT

A method of barite scale removal includes injecting a drilling fluid system containing a nanodot-treated chelating agent into tubing disposed in a wellbore in a subterranean geological formation. A chelating agent in the nanodot-treated chelating agent is diethylenetriamine pentaacetate and/or ethylenediaminetetraacetic acid. The nanodot-treated chelating agent has an emission wavelength of 400 to 500 nm while being illuminated with ultraviolet light at a wavelength of 365 nm. The method further includes circulating the drilling fluid system in the tubing to remove the scale from the tubing.

20 Claims, 6 Drawing Sheets

(56) References Cited

OTHER PUBLICATIONS

Badr S. Bageri, et al., “Evaluation of Barium Sulfate (Barite) Solubility Using Different Chelating Agents at a High Temperature”, Journal of Petroleum Science and Technology, vol. 7, Issue 1, Feb. 20, 2017, pp. 42-56.
Chao Ma, et al., “Preparation of barium sulfate chelating agent DTPA-5Na and molecular dynamics simulation of chelating mechanism”, RSC Advances 2023, vol. 13, Issue 49, Nov. 24, 2023, pp. 34455-34463.

* cited by examiner

METHOD OF BARITE SCALE REMOVAL

CROSS REFERENCE TO RELATED APPLICATION

This application claims the benefit of U.S. Provisional Application No. 63/748,812, filed Jan. 23, 2025, which is incorporated herein by reference in its entirety.

BACKGROUND

Technical Field

The present disclosure generally relates to wellbore treatment and scale management in subterranean geological formations. More particularly, the present disclosure relates to methods for removing barite-based scale and filter cake deposits from wellbore tubing and associated downhole components using nanodot-treated chelating agents incorporated into drilling fluid systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Filter-cake and scale removal remain as challenges in the oil and gas industry. In open-hole completion systems, the drilling fluid filter cake must be effectively removed prior to production to enhance well productivity and prevent operational issues such as pipe sticking [Al-Mutairi, S. H., et al., Lessons learned from stimulation treatments and filter cake removal practices in high-permeability carbonate during the drilling phase, *Society of Petroleum Engineers—International Oil and Gas Conference and Exhibition in China* (*IOGCEC*), 4, 2010, 2503-2511]. Barite scale commonly forms in the near-wellbore region, casing, and production tubulars during drilling and production operations. Primary sources of barite include barite-based drilling fluids and injection of sulfate-rich water. Numerous mitigation strategies have been proposed, including both chemical and mechanical approaches, to prevent barite from forming and to breakdown barite formed [Risthaus, P., et al., Barite scale formation and dissolution at high ionic strength studied with atomic force microscopy, *Colloids and Surfaces A: Physicochemical and Engineering Aspects,* 191, 2001, 201-214; Blanco, M., et al., Activated complex theory of barite scale control processes, *Molecular Engineering,* 7, 1997, 491-514; and Bageri, B. S., et al., Toward a complete removal of barite (barium sulfate, $BaSO_4$) scale using chelating agents and catalysts, *Arabian Journal for Science and Engineering,* 42, 2017, 1667-1674].

Among chemical solutions, chelating agents combined with converter catalysts have been used for dissolving filter cake and barite scale. Diethylenetriamine pentaacetate (DTPA) and ethylenediaminetetraacetic acid (EDTA) have been evaluated in combination with catalysts such as potassium carbonate ($K_2CO_3$) and potassium chloride (KCl). The highest reported performance was achieved using 20 wt. % DTPA with 6 wt. % $K_2CO_3$, which resulted in approximately 90% filter-cake removal efficiency at a temperature of 270° F. after 24 hours of soaking; however, a limitation of the system was its strong temperature dependence [Bageri, B. S., et al., Single-stage filter cake removal of barite-weighted water-based drilling fluid, *Journal of Petroleum Science and Engineering,* 149, 2017, 476-484; and US20170145289A1]. At lower temperatures, the removal efficiency decreased, dropping to approximately 70% at 158° F. This limitation restricts applicability of such formulations in shallow wells and low-temperature reservoirs.

To address temperature dependency, in situ heat-generating chemicals, commonly referred to as thermochemical systems, have been proposed as alternative filter-cake removal solutions. These systems rely on reactions between an oxidizer and an acid precursor, such as ammonium fluoride and sodium bromate. Although the primary reaction is endothermic, the overall system can generate substantial heat through coupled reactions or favorable environmental conditions. Such reactions have been reported to raise temperatures up to 600° F. and generate pressures as high as 3470 psi [Bageri, B. S., Gomaa, I., Mahmoud, M., Patil, S. & Al-Nakhli, A. Complex barite filter cake removal using in-situ generated acids by thermochemicals. *Sci. Rep.* 10, 15773 (2020)]. Elevated temperature enhances filter-cake dissolution, while the induced pressure promotes turbulence that helps mitigate precipitation of reaction by-products. Thermochemical systems suffer from drawbacks including generation of highly corrosive acids such as hydrofluoric acid (HF) and/or hydrochloric acid (HCl). These acids pose serious risks to wellbore integrity, tubulars, and completion equipment if not carefully controlled. They raise additional concerns related to environmental impacts and operational safety.

There remains a need to develop novel, cost-effective, and environmentally sustainable solutions that can improve filter-cake and barite-scale removal efficiency while overcoming temperature limitations and corrosivity issues associated with existing chemical and thermochemical methods. Accordingly, an aspect of the current invention is to provide a method of barite scale removal with a nanodot-treated chelating agent that overcomes drawbacks and limitations of the art.

SUMMARY

In an exemplary embodiment, a method of barite scale removal is described. The method includes injecting a drilling fluid system including a nanodot-treated chelating agent into tubing disposed in a wellbore in a subterranean geological formation. A chelating agent in the nanodot-treated chelating agent is selected from the group consisting of diethylenetriamine pentaacetate and ethylenediaminetetraacetic acid. The nanodot-treated chelating agent has an emission wavelength of 400 to 500 nm while being illuminated with ultraviolet light at a wavelength of 365 nm. The method further includes circulating the drilling fluid system in the tubing to remove the scale from the tubing.

In some embodiments, the scale further comprises calcite.

In some embodiments, the scale is in the form of a filter cake.

In some embodiments, the nanodot-treated chelating agent is present in the drilling fluid system at a concentration of 10 to 25 percent by weight (wt. %) based on a total weight of the drilling fluid system, the method includes a single stage of injecting and circulating, and 90% by weight or more of the scale is removed.

In some embodiments, the nanodot-treated chelating agent is present in the drilling fluid system at a concentration of 0.1 to 5 wt. % based on a total weight of the drilling fluid system.

In some embodiments, the chelating agent in the nanodot-treated chelating agent is diethylenetriamine pentaacetate and the drilling fluid system is capable of dissolving barite in an amount of 45 to 55 grams per liter of drilling fluid.

In some embodiments, the chelating agent in the nanodot-treated chelating agent is ethylenediaminetetraacetic acid and the drilling fluid system is capable of dissolving barite in an amount of 27 to 29 grams per liter of drilling fluid.

In some embodiments, the chelating agent in the nanodot-treated chelating agent is diethylenetriamine pentaacetate and the nanodot-treated chelating agent has an emission wavelength of 460 to 490 nm while being illuminated with ultraviolet light at a wavelength of 365 nm.

In some embodiments, the chelating agent in the nanodot-treated chelating agent is ethylenediaminetetraacetic acid and the nanodot-treated chelating agent has an emission wavelength of 430 to 460 nm while being illuminated with ultraviolet light at a wavelength of 365 nm.

In some embodiments, the circulating occurs at a subterranean geological formation temperature of 50 to 80° C.

In some embodiments, the circulating occurs at a subterranean geological formation temperature of 90 to 200° C.

In some embodiments, the circulating occurs at a subterranean geological formation temperature of up to 450° C.

In some embodiments, a pressure in the tubing is 400 to 600 psi during the circulating.

In some embodiments, the circulating occurs at a rate of 1000 to 4000 liters per minute.

In some embodiments, the drilling fluid system includes water in an amount of 330 to 370 pounds, bentonite in an amount of 3 to 7 pounds, xanthan gum in an amount of 0.1 to 1 pound, a defoamer in an amount of 0.0001 to 0.0003 pounds, potassium chloride in an amount of 18 to 22 pounds, potassium hydroxide in an amount of 0.1 to 1 pound, a polyanionic cellulose polymer in an amount of 0.1 to 2 pounds, calcium carbonate in an amount of 4 to 6 pounds, sodium carbonate in an amount of 0.1 to 1 pound, and a starch in an amount of 5 to 7 pounds.

In some embodiments, a process for making the nanodot-treated chelating agent includes dissolving the chelating agent in water to form a first solution, adding a base to the first solution to form a second solution having a pH of 11 to 11.5, and heating the second solution at a temperature of 160 to 200° C. for 20 to 28 hours to form the nanodot-treated chelating agent.

In some embodiments, the base is potassium hydroxide.

In some embodiments, the method of heating the second solution occurs in a hydrothermal cell in an autoclave.

In some embodiments, a weight ratio of the chelating agent to the water is 10:90 to 30:70.

In some embodiments, the process for making the nanodot-treated chelating agent further includes cooling the nanodot-treated chelating agent to a temperature of 2 to 6° C. and filtering the cooled nanodot-treated chelating agent through a 5 μm filter medium to isolate the nanodot-treated chelating agent.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
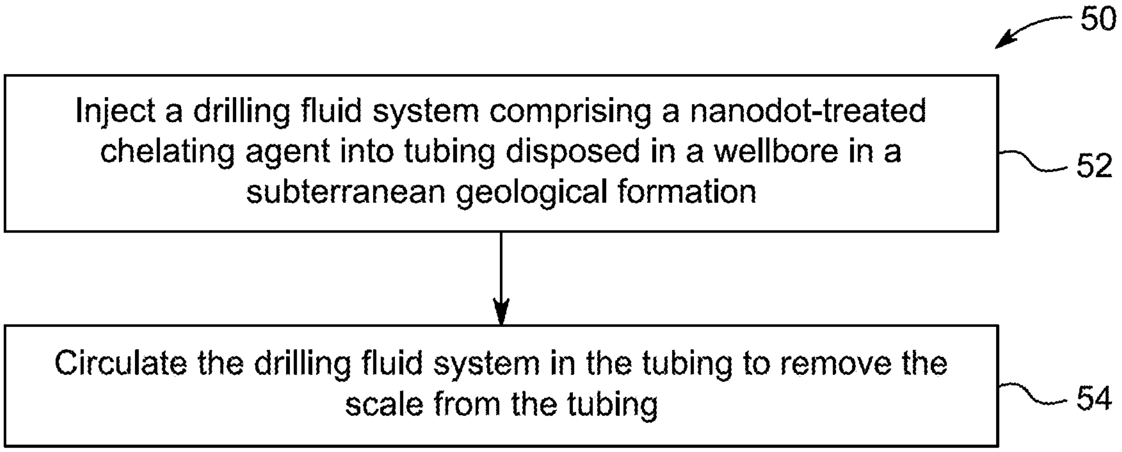
FIG. 1A is a schematic flow chart of a method of barite scale removal, according to certain embodiments.

When describing the present disclosure, the terms used are to be construed in accordance with the following definitions, unless a context dictates otherwise.

Embodiments of the present invention may now be described more fully hereinafter with reference to the accompanying drawings wherever applicable, in that some, but not all, embodiments of the disclosure are shown.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "filter cake" refers to the layer of solid particles deposited on a surface, i.e., a borehole, tubing in a borehole, and/or a wellbore, during filtration of a drilling fluid, which serves to reduce fluid invasion into subterranean formations.

As used herein, the term "subterranean geological formation" refers to any naturally occurring rock strata, reservoir, or sediment located beneath the earth's surface that may be penetrated or encountered during drilling operations.

A filter cake formed over a wellbore using barite- and/or calcite-weighted drilling fluid formulations is difficult to remove, particularly when polymeric additives are present that encapsulate and/or bind insoluble mineral particles. Such filter cakes can impair well productivity, cause formation damage, and/or hinder subsequent completion or production operations.

Conventional multi-stage treatments, including acidizing or separate chelation steps, often suffer from limited effectiveness, operational complexity, and compatibility issues under high-temperature conditions.

The present disclosure provides a solution to removing barite scale whereby a barite- and/or calcite-based filter cake can be dissolved in a single-stage treatment. The designed chemical treatment is further applicable to the removal of scale deposits formed within subterranean formations and/or on tubular pipelines, including production tubing, liners, and casing. In addition to mineral dissolution, the disclosed formulation demonstrates the ability to break, degrade, or weaken polymeric coatings surrounding the deposited filter cake and/or scale, thereby enhancing access of the active chelating components to the mineral phase and improving overall removal efficiency.

A single stage treatment preferably includes only one cycle (episode) of exposing a filter cake (scale) to a treatment fluid for removal of scale deposits. The filter cake and/or scale may be present on tubing or production equipment disposed downhole in a subterranean geological formation. A single stage treatment involves a single cycle (episode) of pressurization or exposure to a nanodot treated chelating agent (NDTCA). For example, a fixed volume of a treatment solution containing NDTCA may be injected into a production tubing disposed in a wellbore such that the volume of the treatment solution is injected or flowed in one uninterrupted aliquot or dosage amount. Subsequently, this volume is allowed to interact with filter cake and/or scale present inside the production well and/or on production equipment disposed therein for a period of time and at conditions of temperature and pressure sufficient to remove the scale. The volume of the treatment fluid remains static although the conditions of treatment such as pressurization, circulating flow, and/or temperature may change during the stage (episode), e.g., the volume of treatment fluid and/or mass of NDTCA remains constant and in fluid contact with the filter cake during the treatment. After treatment the treatment fluid flows from the production equipment and/or production well. Preferably at least 85% by weight, more preferably 90% by weight, preferably 95% by weight or preferably 98% by weight of the scale representing the filter cake, e.g., scale on the tubing, is removed in the single-stage treatment.

Formulation of the present disclosure includes a nanodot treated chelating agent (NDTCA) for filter cake removal. The NDTCA formulation is capable of removing barite- and/or calcite-based filter cake layers and further exhibits the ability to degrade polymeric materials associated with filter cake layers, when present. The nanodot treatment modifies the chelating agent at the nanoscale, improving its surface interaction, thermal stability, and reactivity toward sulfate- and carbonate-based scale while simultaneously disrupting polymer chains used in drilling fluid systems.

The base chemistry of the present invention, a nanodot treated chelating agent, referred to herein as "NDTCA," is environmentally sustainable and designed to reduce the need for aggressive mineral acids or multi-component treatment sequences. The formulation exhibits high dissolution efficiency at relatively low temperatures, enabling effective clean-up in low-temperature formations. Further, the system remains chemically and thermally stable at temperatures of up to 400° C., with dissolution efficiency increasing as temperature rises, making it suitable for high-temperature and ultra-high-temperature well environments.

FIG. 1A illustrates a flow chart of a method 50 of barite scale removal. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a drilling fluid system including a nanodot-treated chelating agent into tubing disposed in a wellbore in a subterranean geological formation. In one or more embodiments, the wellbore may be present in an oil well, a gas well, a production well, an injection well, a naturally flowing well, an artificially lifted well, a high-temperature well, a steam-assisted gravity drainage well, a steam injector well, a geothermal well, a combination thereof, and the like. The wellbore may be formed in the subterranean geologic formation by known techniques. The subterranean geological formation may include, but is not limited to, a depleted oil reservoir, a depleted gas reservoir, a sour reservoir, a hydrocarbon-bearing subterranean formation, a saline formation, an unminable coal bed, a combination thereof, and the like. The tubing may include, but is not limited to, drill pipe, production tubing, casing, liners, coiled tubing, or combinations thereof. The chelating agent in the nanodot-treated chelating agent is selected from the group consisting of diethylenetriamine pentaacetate (DTPA) and ethylenediaminetetraacetic acid (EDTA).

In some embodiments, the chelating agent in the nanodot-treated chelating agent includes DTPA, and the DTPA is chemically modified through nanodot formation, resulting in a chelating agent having enhanced metal-ion coordination capacity, improved thermal stability, and increased reactivity toward barium-containing scale deposits. The DTPA-based nanodot-treated chelating agent may be employed in high-temperature wellbore environments while maintaining chemical integrity and scale-dissolution efficiency.

In other embodiments, the chelating agent in the nanodot-treated chelating agent includes EDTA, and the EDTA undergoes nanodot formation to yield a chelating agent exhibiting improved penetration into mineral scale matrices and enhanced dissolution of sulfate- and carbonate-based scale. The EDTA-based nanodot-treated chelating agent can be effective in mixed barite-calcite scale environments.

In some embodiments, the nanodot-treated chelating agent includes a combination of DTPA and EDTA, wherein the relative proportions of DTPA and EDTA are selected to balance barite dissolution capacity, thermal stability, and economic efficiency.

The nanodot-treated chelating agent has an emission wavelength of 400 to 500 nm, preferably 405 to 495 nm, preferably 410 to 490 nm, preferably 415 to 485 nm, preferably 420 to 480 nm, preferably 425 to 475 nm, preferably 430 to 470 nm, preferably 435 to 465 nm, preferably 440 to 460 nm, and preferably 445 to 455 nm while being illuminated with ultraviolet light at a wavelength of 365 nm. Through nanodot treatment, the chelating agent exhibits photoluminescent properties, specifically an emission wavelength in a range of 400 to 500 nm when illuminated with ultraviolet (UV) light at a wavelength of 365 nm. This optical characteristic enables visual and/or sensor-based verification of fluid placement, penetration into the filter cake, and circulation effectiveness. In some embodiments, the emission wavelength is detected using downhole optical sensors, surface-mounted UV light sources, and/or sample fluorescence analysis to confirm placement of the drilling fluid system, assess treatment uniformity, and/or determine treatment completion.

In an embodiment, the chelating agent in the nanodot-treated chelating agent is ethylenediaminetetraacetic acid and the nanodot-treated chelating agent has an emission wavelength of 430 to 460 nm, preferably 432 to 458 nm, preferably 434 to 456 nm, preferably 436 to 454 nm, preferably 438 to 452 nm, preferably 440 to 450 nm, preferably 442 to 448 nm, and preferably 444 to 446 nm while be being illuminated with ultraviolet light at a wavelength of 365 nm.

In some embodiments, the chelating agent in the nanodot-treated chelating agent is diethylenetriamine pentaacetate and the nanodot-treated chelating agent has an emission wavelength of 460 to 490 nm, preferably 462 to 488 nm, preferably 464 to 486 nm, preferably 466 to 484 nm, preferably 468 to 482 nm, preferably 470 to 480 nm, preferably 472 to 478 nm, and preferably 474 to 476 nm while be being illuminated with ultraviolet light at a wavelength of 365 nm.

In some embodiments, the nanodot-treated chelating agent is present in the drilling fluid system at a concentration of 10 to 25 percent by weight (wt. %), preferably 11 to 24 wt. %, preferably 12 to 23 wt. %, preferably 13 to 22 wt. %, preferably 14 to 21 wt. %, preferably 15 to 20 wt. %, preferably 16 to 19 wt. %, and preferably 17 to 18 wt. % based on a total weight of the drilling fluid system. In some embodiments, the nanodot-treated chelating agent is present in the drilling fluid system at a concentration suitable for aggressive removal of thick barite scale deposits and consolidated filter cake layers formed under high-temperature and high-pressure wellbore conditions. For example, concentrations of 12 to 20 wt. %, or more narrowly 15 to 18 wt. %, may be used in wells exhibiting substantial barite deposition along production tubing or near the wellbore face.

In some embodiments, the method includes a single stage of the injecting and circulating and 90%, preferably 91%, preferably 92%, preferably 93%, preferably 94%, preferably 95%, preferably 96%, preferably 97%, preferably 98%, preferably 99%, more preferably 99.5%, and yet more preferably 100% by weight of the scale is removed. In alternative embodiments, the method may include more than a single stage (i.e., two, three, four, five or more stages) of the injecting and circulating and 90%, preferably 91%, preferably 92%, preferably 93%, preferably 94%, preferably 95%, preferably 96%, preferably 97%, preferably 98%, preferably 99%, more preferably 99.5%, and yet more preferably 100% by weight of the scale is removed.

In other embodiments, the nanodot-treated chelating agent is present in the drilling fluid at a concentration of 0.1 to 5 wt. %, preferably 0.2 to 4.8 wt. %, preferably 0.4 to 4.6 wt. %, preferably 0.6 to 4.4 wt. %, preferably 0.8 to 4.2 wt. %, preferably 1 to 4 wt. %, preferably 1.2 to 3.8 wt. %, preferably 1.4 to 3.6 wt. %, preferably 1.6 to 3.4 wt. %, preferably 1.8 to 3.2 wt. %, preferably 2 to 3 wt. %, preferably 2.2 to 2.8 wt. %, and preferably 2.4 to 2.6 wt. % based on the total weight of the drilling fluid system. In some embodiments the nanodot-treated chelating agent is present in the drilling fluid system at a concentration which may be employed for removal of thinner scale layers, prevention or mitigation of early-stage scale formation, or treatments where extended circulation or soak times are acceptable. By way of example, concentrations of 0.5 to 3 wt. %, or more narrowly 1 to 2 wt. %, may be used in maintenance treatments, post-drilling clean-up operations, or wells having moderate temperature and pressure conditions.

In still further embodiments, intermediate concentration ranges of 5 to 10 wt. % may be utilized to balance scale dissolution efficiency with fluid cost and compatibility with other drilling fluid additives, particularly in mixed-scale environments including barite and calcite. These concentration ranges may be selected based on factors including scale thickness, tubing diameter, circulation rate, formation temperature, and desired treatment duration.

At step 54, the method 50 includes circulating the drilling fluid system in the tubing to remove the scale from the tubing. In other embodiments, the method includes circulating the drilling fluid system in the wellbore to remove the scale from the wellbore. In alternative embodiments, the method includes circulating the drilling fluid system in the subterranean geological formation to remove the scale from the subterranean geological formation. Circulation may occur under a range of subterranean geological formation temperatures. In some embodiments, the circulating occurs at a subterranean geological formation temperature of 50 to 80° C., preferably 52 to 78° C., preferably 54 to 76° C., preferably 56 to 74° C., preferably 58 to 72° C., preferably 60 to 70° C., preferably 62 to 68° C., and preferably 64 to 66° C. In other embodiments, the circulating occurs at a subterranean geological formation temperature of 90 to 200° C., preferably 95 to 195° C., preferably 100 to 190° C., preferably 105 to 185° C., preferably 110 to 180° C., preferably 115 to 175° C., preferably 120 to 170° C., preferably 125 to 165° C., preferably 130 to 160° C., preferably 135 to 155° C., and preferably 140 to 150° C. In some embodiments, the circulating occurs at a subterranean geological formation temperature up to 450° C., preferably up to 440° C., preferably up to 430° C., preferably up to 420° C., preferably up to 410° C., preferably up to 400° C., preferably up to 390° C., preferably up to 380° C., preferably up to 370° C., preferably up to 360° C., preferably up to 350° C., preferably up to 340° C., preferably up to 330° C., preferably up to 320° C., preferably up to 310° C., preferably up to 300° C., preferably up to 290° C., preferably up to 280° C., preferably up to 270° C., preferably up to 260° C., preferably up to 250° C., preferably up to 240° C., preferably up to 230° C., preferably up to 220° C., and preferably up to 210° C. In some embodiments, the circulating occurs at a subterranean geological formation temperature up to 450° C., preferably up to 460° C., preferably up to 470° C., preferably up to 480° C., preferably up to 490° C., and preferably up to 500° C., thereby enabling use in high-temperature deep-well environments. In some embodiments, a pressure in the tubing is 400 to 600 psi, preferably 410 to 590 psi, preferably 420 to 580 psi, preferably 430 to 570 psi, preferably 440 to 560 psi, preferably 450 to 550 psi, preferably 460 to 540 psi, preferably 470 to 530 psi, preferably 480 to 520 psi, and preferably 490 to 510 psi during the circulating. In some embodiments, the circulating occurs at a rate of 1000 to 4000 liters per minute, preferably 1100 to 3900 liters per minute, preferably 1200 to 3800 liters per minute, preferably 1300 to 3700 liters per minute, preferably 1400 to 3600 liters per minute, preferably 1500 to 3500 liters per minute, preferably 1600 to 3400 liters per minute, preferably 1700 to 3300 liters per minute, preferably 1800 to 3200 liters per minute, preferably 1900 to 3100 liters per minute, preferably 2000 to 3000 liters per minute, preferably 2100 to 2900 liters per minute, preferably 2200 to 2800 liters per minute, preferably 2300 to 2700 liters per minute, and preferably 2400 to 2600 liters per minute. In some embodiments, the temperature, pressure, and rate of circulating enables sufficient fluid shear and contact time to promote dissolution and mechanical removal of the scale.

In some embodiments, the scale further comprises calcite. In certain embodiments, the scale includes barite with calcite as an additional component. Such mixed sulfate-carbonate scales commonly occur due to drilling fluid formulations and formation mineralogy. In some embodiments, the scale is in the form of a filter cake. In further embodiments, the scale is present in the form of a filter cake, which may include barite particles, calcite particles, polymeric additives, and bridging agents adhered to tubing surfaces or wellbore walls. The disclosed method is effective in dissolving both the mineral and polymeric components of the filter cake.

In some embodiments, the chelating agent in the nanodot-treated chelating agent is diethylenetriamine pentaacetate (DTPA) and the drilling fluid system is capable of dissolving barite in an amount of 45 to 55 grams per liter of drilling fluid, preferably 46 to 54 grams per liter of drilling fluid, preferably 47 to 53 grams per liter of drilling fluid, preferably 48 to 52 grams per liter of drilling fluid, more preferably 49 to 51 grams per liter of drilling fluid, and yet more preferably about 50 grams per liter of drilling fluid. In a preferred embodiment, the chelating agent in the nanodot-treated chelating agent is diethylenetriamine pentaacetate and the drilling fluid system is capable of dissolving barite in an amount of 50 grams per liter of drilling fluid.

In some embodiments, the chelating agent in the nanodot-treated chelating agent is ethylenediaminetetraacetic acid (EDTA) and the drilling fluid system is capable of dissolving barite in an amount of 27 to 29 grams per liter of drilling fluid, preferably 27.1 to 28.9 grams per liter of drilling fluid, preferably 27.2 to 28.8 grams per liter of drilling fluid, preferably 27.3 to 28.7 grams per liter of drilling fluid, preferably 27.4 to 28.6 grams per liter of drilling fluid, preferably 27.5 to 28.5 grams per liter of drilling fluid, preferably 27.6 to 28.4 grams per liter of drilling fluid, preferably 27.7 to 28.3 grams per liter of drilling fluid, preferably 27.8 to 28.2 grams per liter of drilling fluid, more preferably 27.9 to 28.1 grams per liter of drilling fluid, and yet more preferably about 28 grams per liter of drilling fluid. In a preferred embodiment, the chelating agent in the nanodot-treated chelating agent is ethylenediaminetetraacetic acid and the drilling fluid system is capable of dissolving barite in an amount of 28 grams per liter of drilling fluid. These dissolution capacities represent an improvement over conventional chelating systems, particularly under high-temperature conditions.

In certain embodiment, the drilling fluid system further includes conventional drilling fluid additives. In an embodiment, the drilling fluid system includes water in an amount of 330 to 370 pounds, preferably 335 to 365 pounds, preferably 340 to 360 pounds, and preferably 345 to 355 pounds. In certain embodiments, the drilling fluid system includes an aqueous base fluid formulation, such as water, in an amount of 0.60 to 0.80 barrels (bbl), preferably 0.65 to 0.75 bbl, and more preferably about 0.69 bbl, based on a total volume of the drilling fluid system. The water functions as a continuous phase and carrier medium for solids, polymers, and additives.

In some embodiments, the drilling fluid system includes bentonite in an amount of 3 to 7 pounds, preferably 4 to 6 pounds, and preferably 4.5 to 5.5 pounds, to provide viscosity, suspension stability, and filter cake formation. In some embodiments, the drilling fluid system includes a viscosifying polymer, such as an XC-polymer or xanthan gum polymer, in an amount of 0.1 to 1 pound, preferably 0.3 to 0.7 pounds, and more preferably about 0.5 pounds, to enhance low-shear-rate viscosity and solids suspension. In some embodiments, the drilling fluid system includes a defoamer in an amount of 0.02 to 0.2 milliliters, preferably 0.05 to 0.17 milliliters, and preferably about 0.08 to 0.14 milliliters to suppress foam formation during mixing and circulation. In some embodiments, the drilling fluid system includes potassium chloride (KCl) in an amount of 15 to 25 pounds, preferably 18 to 22 pounds, and more preferably 19 to 21 pounds to provide shale inhibition and ionic stability. In some embodiments, the drilling fluid system includes potassium hydroxide (KOH) in an amount of 0.1 to 1.0 pound, preferably 0.3 to 0.7 pounds, and preferably 0.4 to 0.6 pounds to adjust alkalinity and maintain the drilling fluid pH within a desired operating range.

In some embodiments, the drilling fluid system includes a polyanionic cellulose (PAC) polymer is included in an amount of 0.1 to 2 pounds, preferably 0.5 to 1.5 pounds, and preferably 0.8 to 1.2 pounds to improve filtration control and reduce fluid loss. In some embodiments, the drilling fluid system includes calcium carbonate in an amount of 4 to 6 pounds, preferably 4.5 to 5.5 pounds to function as a bridging agent and supplemental fluid-loss control material. In some embodiments, the drilling fluid system includes sodium carbonate ($Na_2CO_3$) in an amount of 0.1 to 1.0 pound, preferably 0.3 to 0.7 pounds, and preferably 0.4 to 0.6 pounds to condition the drilling fluid and mitigate hardness effects. In some embodiments, the drilling fluid system includes starch in an amount of 5 to 7 pounds, preferably 5.5 to 6.5 pounds to further enhance filtration control and improve filter cake quality.

In an embodiment, the drilling fluid system comprises water in an amount of 330 to 370 pounds, preferably 335 to 365 pounds, preferably 340 to 360 pounds, and preferably 345 to 355 pounds, bentonite in an amount of 3 to 7 pounds, preferably 3.5 to 6.5 pounds, preferably 4 to 6 pounds, and preferably 4.5 to 5.5 pounds, xanthan gum in an amount of 0.1 to 1 pound, preferably 0.2 to 0.8 pounds, preferably 0.3 to 0.7 pounds, more preferably 0.4 to 0.6 pounds, and yet more preferably about 0.5 pounds, a defoamer in an amount of 0.0001 to 0.0003 pounds, preferably 0.00015 to 0.00025 pounds, and preferably 0.00017 to 0.00023 pounds, potassium chloride in an amount of 18 to 22 pounds, preferably 19 to 21 pounds, and more preferably about 20 pounds, potassium hydroxide in an amount of 0.1 to 1 pound, preferably 0.2 to 0.8 pounds, more preferably 0.4 to 0.6 pounds, and yet more preferably about 0.5 pounds, a polyanionic cellulose polymer in an amount of 0.1 to 2 pounds, preferably 0.3 to 1.7 pounds, preferably 0.5 to 1.5 pounds, more preferably 0.8 to 1.2 pounds, and yet more preferably about 1 pound, calcium carbonate in an amount of 4 to 6 pounds, preferably 4.5 to 5.5 pounds, and more preferably about 5 pounds, sodium carbonate in an amount of 0.1 to 1 pound, preferably 0.2 to 0.8 pounds, more preferably 0.4 to 0.6 pounds, and yet more preferably about 0.5 pounds, and a starch in an amount of 5 to 7 pounds, preferably 5.5 to 6.5 pounds, and more preferably about 6 pounds.

Figure 1B:
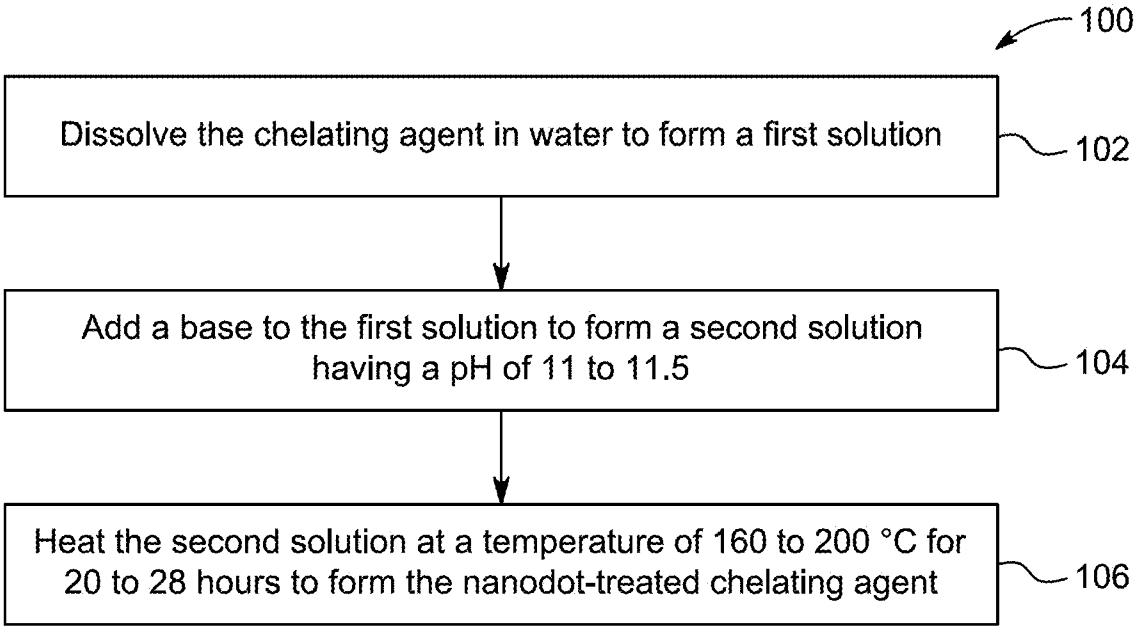
FIG. 1B is a schematic flowchart of a process of making a nanodot-treated chelating agent, according to certain embodiments.

In broader embodiments, each component of the drilling fluid system may independently vary by ±10 to 25%, preferably ±12 to 23%, preferably ±14 to 21%, and preferably ±16 19% to accommodate differences in wellbore temperature, pressure, formation composition, and circulation rate. In narrower embodiments, the formulation has a compatibility with a nanodot-treated chelating agent by maintaining polymer loadings and weighting agent concentrations within the specified ranges to promote effective circulation, scale dissolution, and filter cake removal without adverse fluid instability or excessive viscosity buildup FIG. 1B illustrates a flow chart of a process 100 of making nanodot-treated chelating agent. The order in which the process 100 is described is not intended to be construed as a limitation, and any number of the described method steps can be combined in any order to implement the process 100. Additionally, individual steps may be removed or skipped from the process 100 without departing from the spirit and scope of the present disclosure.

At step 102, the process 100 includes dissolving the chelating agent in water to form a first solution. The chelating agent may be selected from diethylenetriamine pentaacetate (DTPA), ethylenediaminetetraacetic acid (EDTA), combinations thereof, and the like. The water may be deionized water, distilled water, field-grade water treated to remove suspended solids, combinations thereof, and the like.

In some embodiments, a weight ratio of the chelating agent to water is 10:90 to 30:70, preferably 12:88 to 28:72, preferably 14:86 to 26:74, preferably 16:84 to 24:76, more preferably 18:82 to 22:78, and yet more preferably about 20:80. In broader embodiments, the weight ratio may range from 5:95 to 40:60, while in narrower embodiments the ratio may be 15:85 to 25:75, such as about 20:80. These ratios enable adequate solubilization of the chelating agent while providing sufficient water content for subsequent nanodot formation. In a preferred embodiment, a weight ratio of the chelating agent to water is 20:80.

At step 104, the process 100 includes adding a base to the first solution to form a second solution having a pH of 11 to 11.5, preferably 11.1 to 11.4, more preferably 11.2 to 11.3, and yet more preferably about 11.2. In certain embodiments, the base is potassium hydroxide (KOH). In alternative embodiments, other alkali bases may be used, provided the desired pH range is achieved without adversely affecting nanodot formation. In broader embodiments, the pH of the second solution may range from 10.5 to 12, while in narrower embodiments the pH may be maintained between 11.1 and 11.4 to provide chelating agent activation and nanodot nucleation.

At step 106, the process 100 includes heating the second solution at a temperature of 160 to 200° C., preferably 165 to 195° C., preferably 170 to 190° C., more preferably 175 to 185° C., and yet more preferably about 180° C. for 20 to 28 hours, preferably 21 to 27 hours, preferably 22 to 26 hours, more preferably 23 to 25 hours, and yet more preferably about 24 hours. In broader embodiments, the temperature may range from 150 to 220° C. and the duration may range from 12 to 36 hours. In narrower embodiments, the temperature may be 170 to 190° C. and the duration 22 to 26 hours, providing controlled nanodot size and uniform optical properties.

In some embodiments, the heating is conducted in a hydrothermal cell positioned within an autoclave. In some embodiments, the hydrothermal cell in the autoclave enables controlled pressure conditions and uniform heat transfer during nanodot formation. The hydrothermal treatment results in chemical modification of the chelating agent, yielding nanodot structures that impart photoluminescent properties while retaining chelation functionality.

In some embodiments, the process of forming the nanodot-treated chelating agent includes post-treatment steps following the hydrothermal heating. In some embodiments, the nanodot-treated chelating agent is cooled to a temperature of 2 to 6° C., preferably 3 to 5° C., and more preferably about 4° C. to stabilize the nanodot structures and arrest further thermal reactions, and the cooled nanodot-treated chelating agent is filtered through a 5 μm filter medium to isolate the nanodot-treated chelating agent and remove undesired particulates, agglomerates, and/or byproducts formed during hydrothermal treatment. In broader embodiments, filtration may be performed using filter media having pore sizes from 1 to 10 μm, while in narrower embodiments the pore size is maintained at approximately 5 μm to achieve consistent particle size distribution and optical performance.

The resulting nanodot-treated chelating agent exhibits chelation efficiency and fluorescence characteristics, making it suitable for use in wellbore scale-removal fluid systems and enabling monitoring of treatment distribution and activity during circulation operations.

EXAMPLES

The following examples demonstrate methods for removing barite scale as described herein. The examples are provided solely for illustration and are not to be construed as limitations of the present disclosure, as many variations thereof are possible without departing from the spirit and scope of the present disclosure.

Example 1: Materials and Methods

Figure 2:
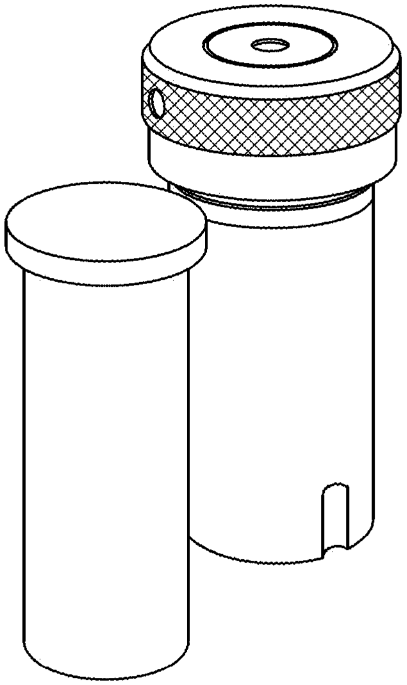
FIG. 2 is a pictorial image of a hydrothermal treatment cell, according to certain embodiments.

Barium sulfate ($BaSO_4$), potassium hydroxide (KOH), diethylenetriamine pentaacetate (DTPA) powder, and ethylenediaminetetraacetic acid (EDTA) powder were purchased from Sigma-Aldrich. DTPA and EDTA solutions with concentration of 20% were prepared by placing 20 g of DTPA or EDTA in 80 g of distilled water. Potassium hydroxide was as a base to the prepared solution to increase the pH to ~11.2. The NDTCA for both DTPA and EDTA solutions were prepared using the hydrothermal method. In this method, the solutions were placed inside a stainless-steel Teflon-lined autoclave cell (FIG. 2) which was placed inside an oven for 24 hours at 180° C. The cell was cooled down after the 24 hours. The solution was stored at temperature of 4° C. until future. The NDTCA to be used was filtered using 5 μm filter medium.

Figure 3A:
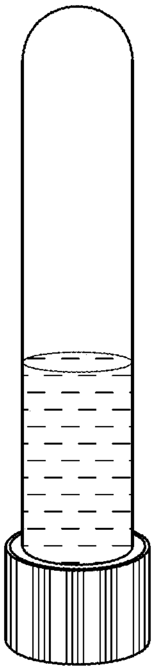
FIG. 3A is an image of diethylenetriaminepentaacetic acid (DTPA) obtained under ultraviolet (UV) light at a wavelength of 365 nm, according to certain embodiments.
Figure 3B:
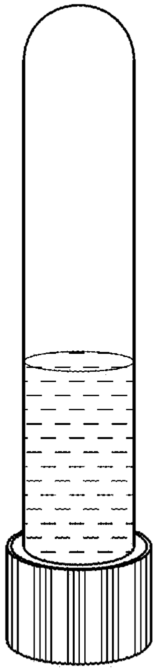
FIG. 3B is an image of a nanodot-treated chelating agent derived from DTPA (NDTCA-DTPA) obtained under UV light at a wavelength of 365 nm, according to certain embodiments.
Figure 3C:
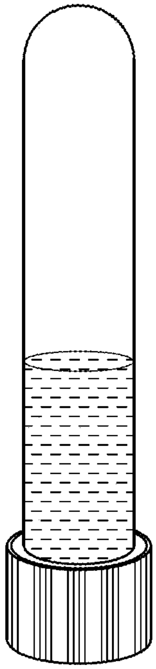
FIG. 3C is an image of a nanodot-treated chelating agent derived from ethylenediaminetetraacetic acid (EDTA) (NDTCA-EDTA) obtained under UV light at a wavelength of 365 nm, according to certain embodiments.
Figure 4A:
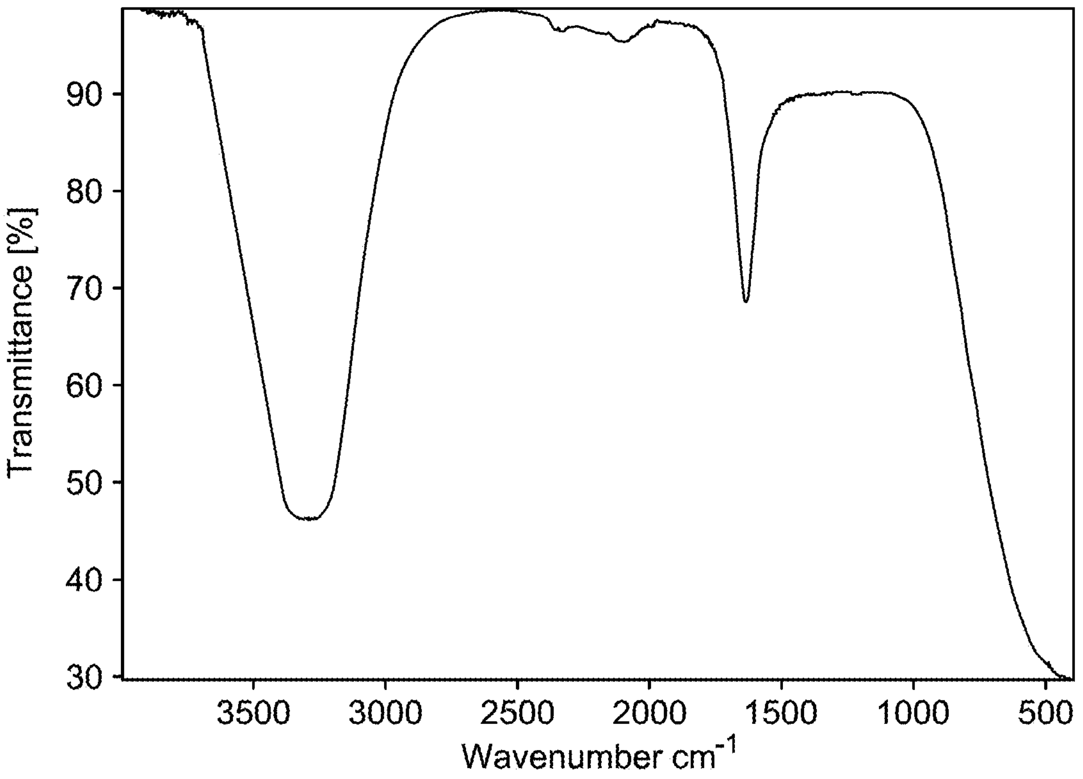
FIG. 4A depicts a Fourier transform infrared (FTIR) spectra of water, according to certain embodiments.
Figure 4B:
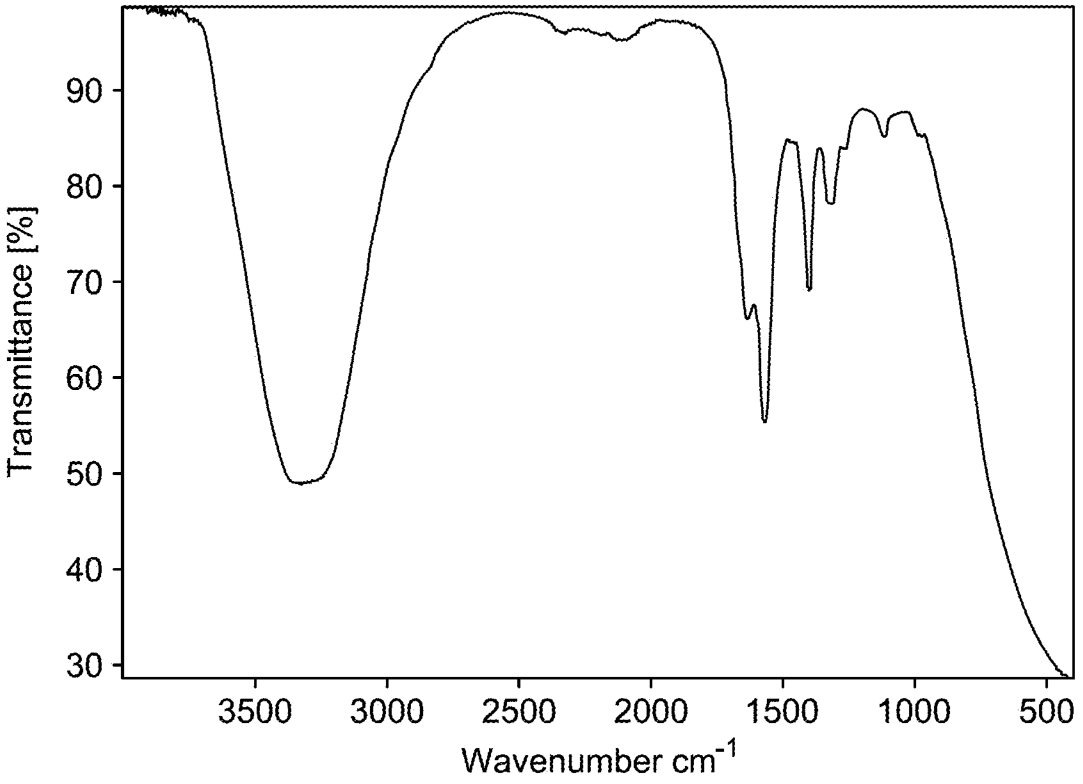
FIG. 4B depicts an FTIR spectra of DTPA, according to certain embodiments.
Figure 4C:
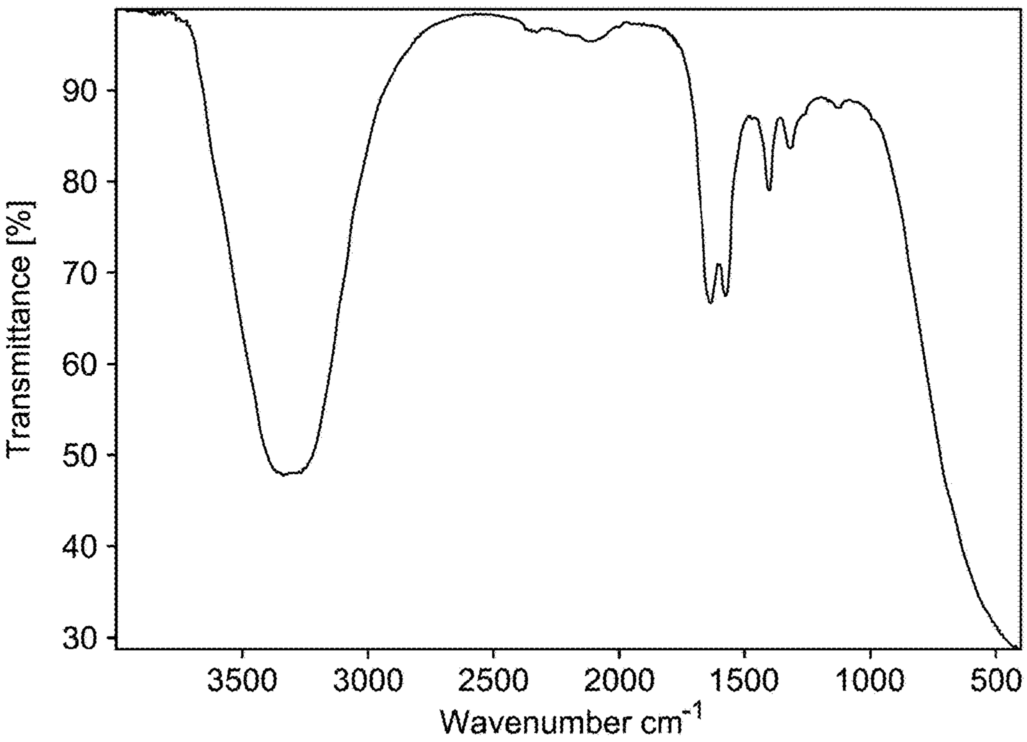
FIG. 4C depicts an FTIR spectra of NDTCA-DTPA, according to certain embodiments.

To assure the formation of the NDTCA, they were exposed to UV light of wavelength equal to 365 nm. The formation of the NDTCA is identified by showing strong blue and purple emission due to its photoluminescent features, as shown in FIG. 3A to FIG. 3C. FTIR spectra of water, DTPA, and NDTCA-DTPA are shown in FIG. 4A to FIG. 4C, respectively. There is no change in the peaks in the NDTCA-DTPA in comparison to the DTPA, indicating there is no change in the functional groups of the two samples (DTPA and NDTCA-DTPA). Wavenumbers higher than 2000 showed the same transmittance due to water in DTPA and NDTCA-DTPA.

Example 2: Testing Procedure

Four grams of $BaSO_4$ were mixed with 100 mL of four different solutions including DTPA, EDTA, NDTCA-DTPA, and NDTCA-EDTA. The solutions were poured in flasks that were connected to reflux condensers to ensure there was no water vaporization. The solutions were stirred at constant rate of 350 rpm at temperature of 100° C. and kept for a soaking time of 24 hours. After 24 hours, the solutions were filtered using a 2 μm filter paper, and the remaining undissolved weight of $BaSO_4$ was used to determine the dissolved $BaSO_4$ weight. The following equation was implemented to determine the solubility:

$$\text{Solubility }\% = \frac{\text{dissolved } BaSO_4 \text{ weight}}{\text{initial } BaSO_4 \text{ weight}} \times 100$$

Figure 5:
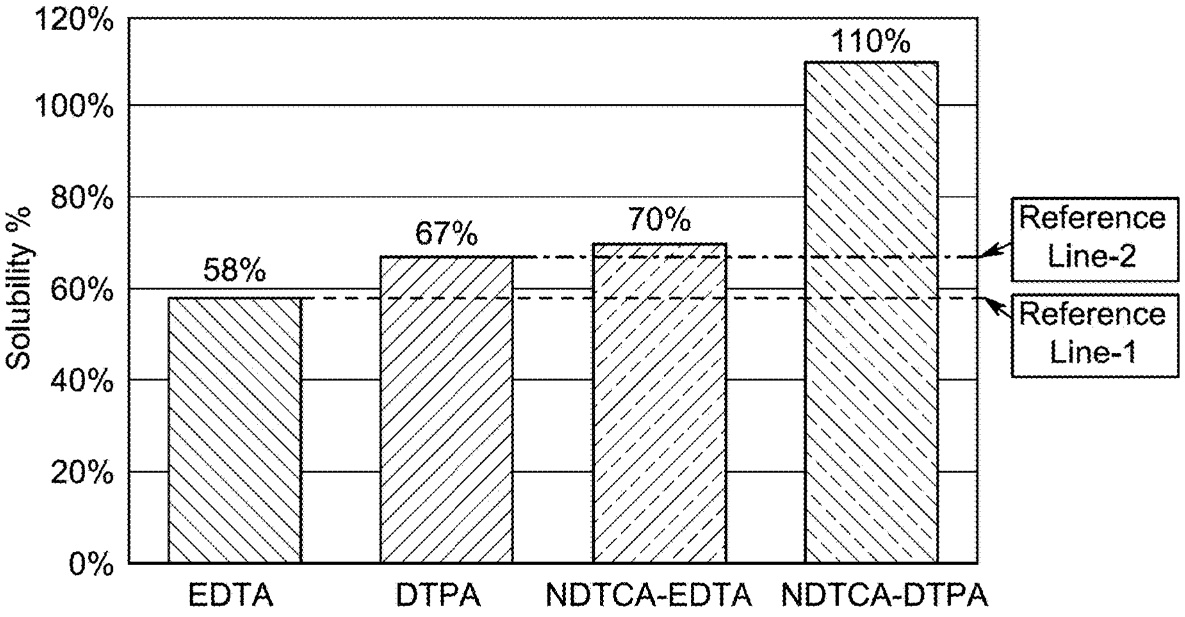
FIG. 5 is a bar graph depicting solubility percentages of $BaSO_4$ in 20% nanodot treated chelating agents (NDTCA) and regular chelating agents (RCH) at 70° C., according to certain embodiments.
Figure 6:
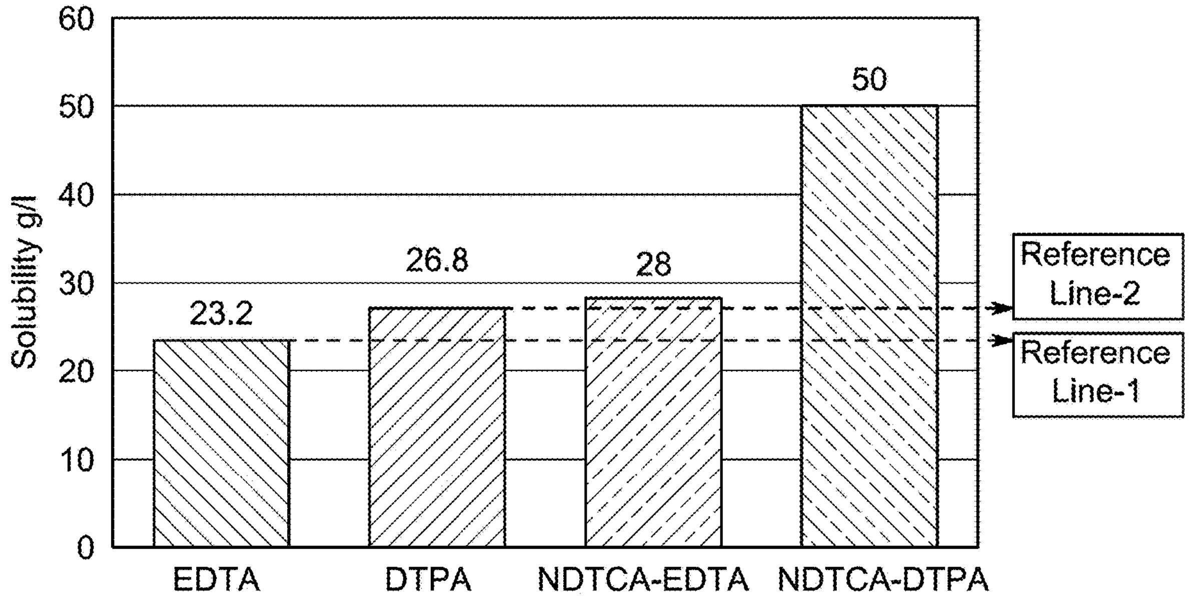
FIG. 6 is a bar graph depicting solubility in grams per liter (g/L) of $BaSO_4$ in 20% NDTCA and RCH at 70° C., according to certain embodiments.

NDTCA of DTPA and EDTA (NDTCA-DTPA and NDTCA-EDTA, respectively) can dissolve the entire $BaSO_4$ in solution, whereas the regular DTPA and EDTA (i.e., unmodified DTPA and unmodified EDTA) dissolve 60% to 70% of the barite in solution; therefore, adding an extra amount of barite to the solution of NDTCA-DTPA and NDTCA-EDTA was examined. The ability of the NDTCA-DTPA to dissolve barite reached up to 50 g in a liter of a 20% NDTCA-DTPA solution. The regular chelating agents (RCH) were not able to achieve such dissolution rate even after adding the converting agent. The reference lines in FIG. 5 and FIG. 6 show the maximum capacity for the RCH (i.e., EDTA and DTPA), which, in the same conditions as NDTCA-EDTA and NDTCA-DTPA, could only dissolve 58% and 67% (out of 40 g/L), respectively. The maximum that the regular existing solution including the DTPA plus the converting agent was 87% (equivalent to 37 g in a liter of solution).

The composition of drilling fluid presented in Table 1 is a real barite weighted water-based drilling fluid system. The density of the prepared drilling fluid was 15 ppg. The fluid was used to form a filter cake on top of a ceramic disk using the fluid loss test. The formed filter cake then was placed again in the cell, and the removal test was conducted to evaluate the performance of the new solution to dissolve the formed filter cake layer. The new NDTCA (i.e., NDTCA-EDTA and NDTCA-DTPA) was able to dissolve the formed filter cake in single stage. The test was conducted at a pressure of 500 psi and a temperature of 300° F.

TABLE 1

| Mud Formulation | | |
|---|---|---|
| Name | Unit | Base Fluid Description |
| Water | bbl | 0.691 |
| Bentonite | lbs | 4-6 |
| XC-polymer | lbs | 0.5 |
| Defoamer | mL | 0.08 |
| KCl | lbs | 20.0 |
| KOH | lbs | 0.5 |
| PAC | lbs | 1 |
| Barite | lbs | 250.0 |
| $CaCO_3$ medium | lbs | 5.0 |
| $Na_2CO_3$ | lbs | 0.5 |
| Starch | lbs | 6 |

Numerous modifications and variations of the present disclosure are possible in light of the above teachings. It is therefore to be understood that within the scope of the appended claims, the disclosure may be practiced otherwise than as specifically described herein.

The invention claimed is:

1. A method of barite scale removal, comprising:

injecting a drilling fluid system comprising a nanodot-treated chelating agent into tubing disposed in a wellbore in a subterranean geological formation, wherein a chelating agent in the nanodot-treated chelating agent is selected from the group consisting of diethylenetriamine pentaacetate and ethylenediaminetetraacetic acid, wherein the nanodot-treated chelating agent has an emission wavelength of 400 to 500 nm while being illuminated with ultraviolet light at a wavelength of 365 nm, and circulating the drilling fluid system in the tubing to remove the scale from the tubing.

2. The method of claim 1, wherein the scale further comprises calcite.

3. The method of claim 1, wherein the scale is in the form of a filter cake.

4. The method of claim 1, wherein the nanodot-treated chelating agent is present in the drilling fluid system at a concentration of 10 to 25 percent by weight (wt. %) based on a total weight of the drilling fluid system, wherein the method includes a single stage of the injecting and circulating, and wherein 90% by weight or more of the scale is removed.

5. The method of claim 1, wherein the nanodot-treated chelating agent is present in the drilling fluid system at a concentration of 0.1 to 5 percent by weight (wt. %) based on a total weight of the drilling fluid system.

6. The method of claim 1, wherein the chelating agent in the nanodot-treated chelating agent is diethylenetriamine pentaacetate and the drilling fluid system is capable of dissolving barite in an amount of 45 to 55 grams per liter of drilling fluid.

7. The method of claim 1, wherein the chelating agent in the nanodot-treated chelating agent is ethylenediaminetetraacetic acid and the drilling fluid system is capable of dissolving barite in an amount of 27 to 29 grams per liter of drilling fluid.

8. The method of claim 1, wherein the chelating agent in the nanodot-treated chelating agent is diethylenetriamine pentaacetate and the nanodot-treated chelating agent has an emission wavelength of 460 to 490 nm while being illuminated with ultraviolet light at a wavelength of 365 nm.

9. The method of claim 1, wherein the chelating agent in the nanodot-treated chelating agent is ethylenediaminetetraacetic acid and the nanodot-treated chelating agent has an emission wavelength of 430 to 460 nm while being illuminated with ultraviolet light at a wavelength of 365 nm.

10. The method of claim 1, wherein the circulating occurs at a subterranean geological formation temperature of 50 to 80° C.

11. The method of claim 1, wherein the circulating occurs at a subterranean geological formation temperature of 90 to 200° C.

12. The method of claim 1, wherein the circulating occurs at a subterranean geological formation temperature of up to 450° C.

13. The method of claim 1, wherein a pressure in the tubing is 400 to 600 psi during the circulating.

14. The method of claim 1, wherein the circulating occurs at a rate of 1000 to 4000 liters per minute.

15. The method of claim 1, wherein the drilling fluid system comprises water in an amount of 330 to 370 pounds, bentonite in an amount of 3 to 7 pounds, xanthan gum in an amount of 0.1 to 1 pound, a defoamer in an amount of 0.0001 to 0.0003 pounds, potassium chloride in an amount of 18 to 22 pounds, potassium hydroxide in an amount of 0.1 to 1 pound, a polyanionic cellulose polymer in an amount of 0.1 to 2 pounds, calcium carbonate in an amount of 4 to 6 pounds, sodium carbonate in an amount of 0.1 to 1 pound, and a starch in an amount of 5 to 7 pounds.

16. The method of claim 1, wherein the nanodot-treated chelating agent is made by a process comprising:

dissolving the chelating agent in water to form a first solution;

adding a base to the first solution to form a second solution having a pH of 11 to 11.5; and heating the second solution at a temperature of 160 to 200° C. for 20 to 28 hours to form the nanodot-treated chelating agent.

17. The method of claim 16, wherein the base is potassium hydroxide.

18. The method of claim 16, wherein the heating occurs in a hydrothermal cell in an autoclave.

19. The method of claim 16, wherein a weight ratio of the chelating agent to the water is 10:90 to 30:70.

20. The method of claim 16, further comprising:

cooling the nanodot-treated chelating agent to a temperature of 2 to 6° C.; and filtering the cooled nanodot-treated chelating agent through a 5 μm filter medium to isolate the nanodot-treated chelating agent.

* * * * *